United States Patent [19]
Wood

[11] Patent Number: 5,263,726
[45] Date of Patent: Nov. 23, 1993

[54] CHILD RESTRAINT STRAP FOR A SHOPPING CART SEAT

[75] Inventor: Jerry W. Wood, Charlotte, N.C.

[73] Assignee: Smart Products, Inc., Charlotte, N.C.

[21] Appl. No.: 740,969

[22] Filed: Aug. 6, 1991

[51] Int. Cl.5 .............................................. B62D 39/00
[52] U.S. Cl. .......................... 280/33.992; 280/33.993
[58] Field of Search ...................... 280/33.992, 33.993, 280/33.991; 224/159, 160, 275; 297/250

[56] References Cited

U.S. PATENT DOCUMENTS

| | | | |
|---|---|---|---|
| 4,324,430 | 4/1982 | Dimas, Jr. et al. | 280/33.993 |
| 4,550,800 | 11/1985 | Dietrich | 280/33.993 |
| 4,637,622 | 1/1987 | Bargard | 280/33.993 |
| 4,854,607 | 8/1989 | Mandracchia et al. | 280/33.992 |
| 4,867,464 | 9/1989 | Cook | 280/33.993 |

*Primary Examiner*—Richard M. Camby
*Attorney, Agent, or Firm*—Charles G. Lamb

[57] ABSTRACT

The shopping cart includes an infant seat and a safety belt restraint device for restraining the infant to prevent the infant from falling from the seat. The safety belt restraint device extends around the waist and between the legs of the infant to secure the infant in the seat.

9 Claims, 2 Drawing Sheets

CHILD RESTRAINT STRAP FOR A SHOPPING CART SEAT

BACKGROUND OF THE INVENTION

1. Field of the Invention

The invention relates to safety devices and more specifically to shopping carts which include safety devices for restraining infants seated in the shopping cart.

2. Description of the Prior Art

Various prior art shopping carts are available permitting care takers of infants to position the infant in a shopping cart as the care taker shops. Typically these prior art shopping carts provided a seat for the infant at some location within the shopping cart. Normally the infant was seated with some structure, typically two generally rod-like members extending upwardly between the infant's legs. However, no specific means was provided to restrain the infant. Infants frequently repositioned his/her legs such that both legs extended through a common opening. When so positioned, some infants could slide through the opening and fall to the floor.

Other prior art shopping carts included simple waist type safety belts permitting the infant to be strapped into the seat. Although the simple waist strap was a significant improvement under circumstances, some infants have been injured. For example, infants may slide from the seat such that the restraint belt is positioned under the infant's chin. The probability of this type of injury is increased if the shopping cart is damaged such that the generally vertical extending members, previously disabled, no longer function for their intended purpose.

It is the object of the present invention to provide a shopping cart including an infant seat and safety strap means effectively restraining the child.

SUMMARY OF THE INVENTION

The preferred embodiment of the invention comprises a shopping cart including safety means for securing an infant in a seat comprising a part of the shopping cart. The preferred embodiment includes a restraint belt having at least first, second and third ends which are respectively attached to first, second and third attachment points to secure the infant in a seated position. Specifically, the restraint means includes a waist portion which has first and second ends which are attached to the shopping cart. The waist portion extends around the waist of the infant to secure the infant in a seated position. A second strap attached to said waist portion between the ends thereof, extends downwardly between the legs of said infant and is attached to said shopping cart. The waist portion is adjusted in length to fit snugly around the waist of the infant to hold the infant in a seated position. Conventional wheels permit the user of the shopping cart to easily propel said cart along a desired path. The second position prevents the infant from sliding from the seat, particularly when the generally vertical extending portions of the seat are damaged.

A conventional package collection compartment provides means for carrying items selected for purchase by the shopper.

DETAILED DESCRIPTION

The present invention provides a shopping cart which includes an infant seat and restraint means for securing an infant in the seat. Specifically, the restraint means include a two part waist belt and a crotch belt extending from the waist belt between the legs of the infant.

Figure 1:
FIG. 1 is a fragmentary drawing illustrating the invention.
Figure 2:
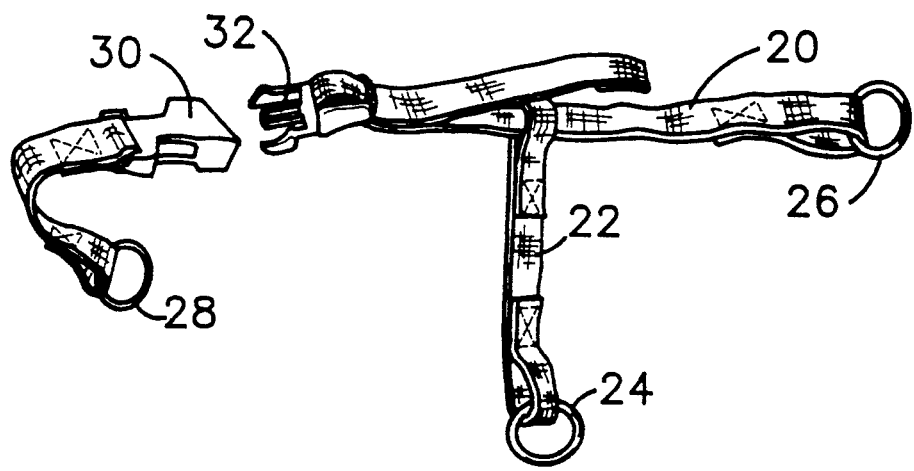
FIG. 2 is a pictorial drawing of the belt restraining means utilized by the invention.

FIG. 1 is a fragmentary drawing illustrating the preferred embodiment of the present invention with the safety strap illustrated in detail in FIG. 2. More specifically, this figure illustrates a child 10 positioned in the shopping cart 12 and held therein by the safety strap means 14.

Shopping carts are available in many designs. Any prior art shopping cart which includes a suitable infant seat can be modified to function in accordance with the disclosed invention by adding a suitable restraint belt of the type illustrated in detail in FIG. 2.

Typically shopping carts include generally "box-shaped" infant seats comprising two substantially identical upwardly extending side portions positioned between the front and back portions. A first edge of each of the side portions is attached to the edges of the back portion resulting in the side portion being positioned substantially vertical and parallel to each other. The front portion includes first and second openings therein for the legs of the infant to extend. Typically, the front portion consists of one or more substantially vertical rod like members. A seat portion positioned between the sides, back and front supports the infant. The disclosed invention utilizes a safety strap permitting the infant to be secured in the seat such that it is essentially impossible for the infant to accidentally fall from the seat.

As illustrated in FIG. 1, the child 10 is positioned to sit on the seat portion 16 of the shopping cart 12. The safety belt made of conventional fabric webbing includes a waist portion 20 extending around the waist of the infant. First and second ends 26 and 28 are secured to the back portion 18 of the seat. The safety strap also includes a crotch portion 22 which includes a loop portion at a first end which is slidably attached to and extends from the waist portion and is secured to the shopping cart at its second end 24. The web portions are conveniently attached to the attachment rings a loop formed by folding the end of the webbing back on itself and sewing the overlapping portions of the webbing together at a location displaced from the folded end of the webbing by a predetermined distance.

The waist portion 20 of the safety strap also includes a two-part buckle with the two parts illustrated at Reference Numerals 30 and 32. The portion 32 of the buckle also includes means permitting the length of the waist portion 20 to be conveniently adjusted to accommodate various sizes of infants. The buckle also includes quick disconnect means permitting the buckle to be fastened and unfastened conveniently. A suitable restraint belt can be constructed using commercially available webbing materials. Suitable attaching means is also available commercially, such as conventional split key rings. Suitable rings are available from B-E Quality Products, Inc., Stanford, Connecticut. Suitable buckles are commercially available.

In prior art shopping carts, the front portion of the seat comprising the upward extending "rod-like" members have been damaged resulting in the safety belt being the only means preventing the infant from sliding from the seat. Such damages to the shopping cart have been associated with the injuries discussed above.

Figure 3:
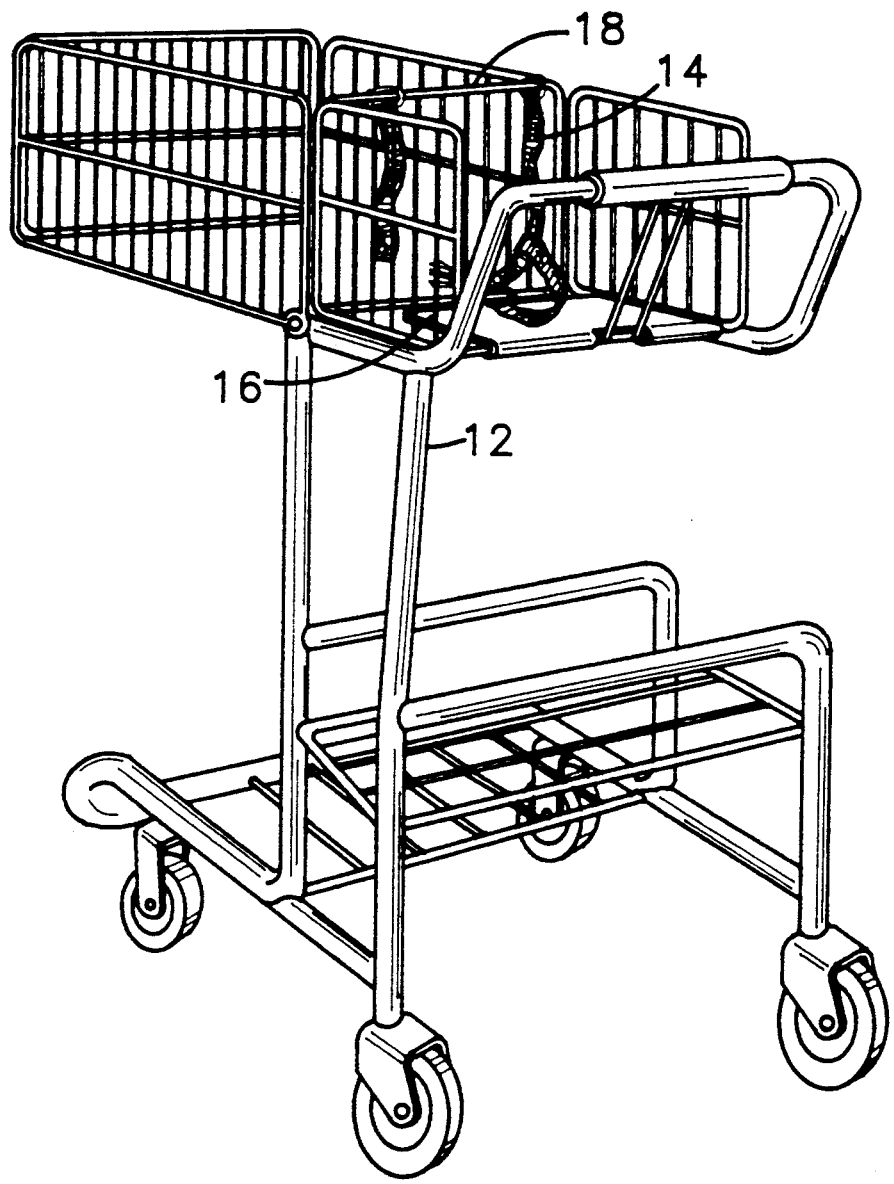
FIG. 3 is a pictorial drawing of a shopping cart in accordance with the invention.

FIG. 3 illustrates the shopping cart 12, in detail, with the safety strap 14 attached. It is also obvious that the safety strap can be applied in other applications such as strollers and infant seats.

The disclosed invention provides improved safety for the infant, as discussed above. However, many modifications may be made all of which are within the scope of the disclosed and claimed invention. For example, the crotch portion may be modified by increasing the width of the end which attaches to the waist portion. Such a modification further modifies the shape of and reduces the size of the openings through which the infant's legs extend. Materials for the safety belt can be selected to reduce water absorption and ice accumulation when the shopping cart is exposed to adverse weather.

I claim:

1. A safety strap for securing an infant in a shopping cart, comprises in combination:
   a. a waist portion including first and second parts, said first part having first and second ends respectively attached to a first part of a quick release buckle and a fastener for attaching to said shopping cart, said second part also including fist and second ends respectively attached to a second part of a quick release buckle and to said shopping cart;
   b. a crotch portion also having first and second ends, said second end having a loop thereon slidably attached to said waist portion and said first end having fixedly attached to said shopping cart.

2. A shopping cart including safety strap means for securing an infant, comprising:
   a. a shopping cart having an infant seat therein, said seat having a front and back portion;
   b. a safety belt device having a waist belt portion and a crotch portion, said waist belt portion having a first strap means with a first end and a second end, said first end fixedly attached to said seat back, and a second strap means having a first end and a second end, said first end fixedly attached to the seat back;
   c. said crotch portion including a third strap means having a first end and a second end, said first end being fixedly attached to said seat back and the second end of said third strap means having a loop thereon and being slidably attached to one of said first or second strap means;
   d. fastening means having first and second attaching portions, said first attaching portion being on said second end of said first strap means and said second attaching portion being on the second end of said second strap means.

3. A safety strap in accordance with claim 2 wherein said safety strap includes split key ring attachment devices as a means for attaching said first and said second strap means to said infant seat back.

4. A safety strap in accordance with claim 3 wherein said waist means includes a web strap with each end folded back and attached to the web at a selected distance from the end to form loops through which said split key ring attachment devices extend.

5. The shopping cart of claim 2 wherein said third strap means is slideably attached to said first or said second strap means.

6. The shopping cart of claim 2 wherein said seat back is provided with an upper and a lower portion, said first end of said first strap means and said first end of said second strap means being attached to said upper portion and said first end of said third strap means attached to the lower portion of said seat back.

7. The shopping cart of claim 1 wherein said set back includes vertically extending opposed side edges wherein said first strap means is attached adjacent one side edge, said second strap means is attached adjacent to said opposite side edge and said third strap means is attached at a spaced position between said first and second strap means.

8. The shopping cart of claim 2 wherein said fastening means includes a two-part buckle means, one part of said buckle means being on said first strap means and said second part of said buckle means being on said second strap means.

9. The shopping cart of claim 2 wherein said front of said infant seat includes openings to receive legs of an infant therethrough.

* * * * *